United States Patent [19]

Moses et al.

[11] Patent Number: 4,579,170

[45] Date of Patent: Apr. 1, 1986

[54] CONTAINER FOR THERMAL ENERGY STORAGE MATERIALS

[75] Inventors: Paul J. Moses, Midland, Mich.; Mark G. Hofius, Lake Jackson, Tex.

[73] Assignee: The Dow Chemical Company, Midland, Mich.

[21] Appl. No.: 635,037

[22] Filed: Jul. 27, 1984

Related U.S. Application Data

[63] Continuation of Ser. No. 486,273, Apr. 18, 1983, abandoned.

[51] Int. Cl.[4] .......... F28D 13/00; F24H 7/00; B65D 00/00
[52] U.S. Cl. ............... 165/104.17; 126/400; 220/72
[58] Field of Search ............ 126/400, 436, 445, 444, 126/437; 252/71; 165/10, 104.17, DIG. 4, DIG. 9; 220/72, 435, 436

[56] References Cited

U.S. PATENT DOCUMENTS 3,720,198  3/1973  Laing .................... 126/400
4,299,274  11/1981  Campbell ................ 126/400

FOREIGN PATENT DOCUMENTS 2017630  10/1979  United Kingdom ........ 220/72
2045423  10/1980  United Kingdom ........ 126/445
2070231  9/1981  United Kingdom ........ 126/437

OTHER PUBLICATIONS

Sales Dept. One Design Inc.; "One Design Waterwall" Apr. 1983.

Primary Examiner—William E. Lyddane
Assistant Examiner—Gerald Anderson

[57] ABSTRACT

A thermal energy storage container is disclosed having a generally rectangular configuration. The container is made of a synthetic resinous material and is rotomolded to form a high-strength and seamless container capable of use over extended periods of time and over many freeze-thaw cycles of a thermal energy storage material contained within the container.

6 Claims, 5 Drawing Figures

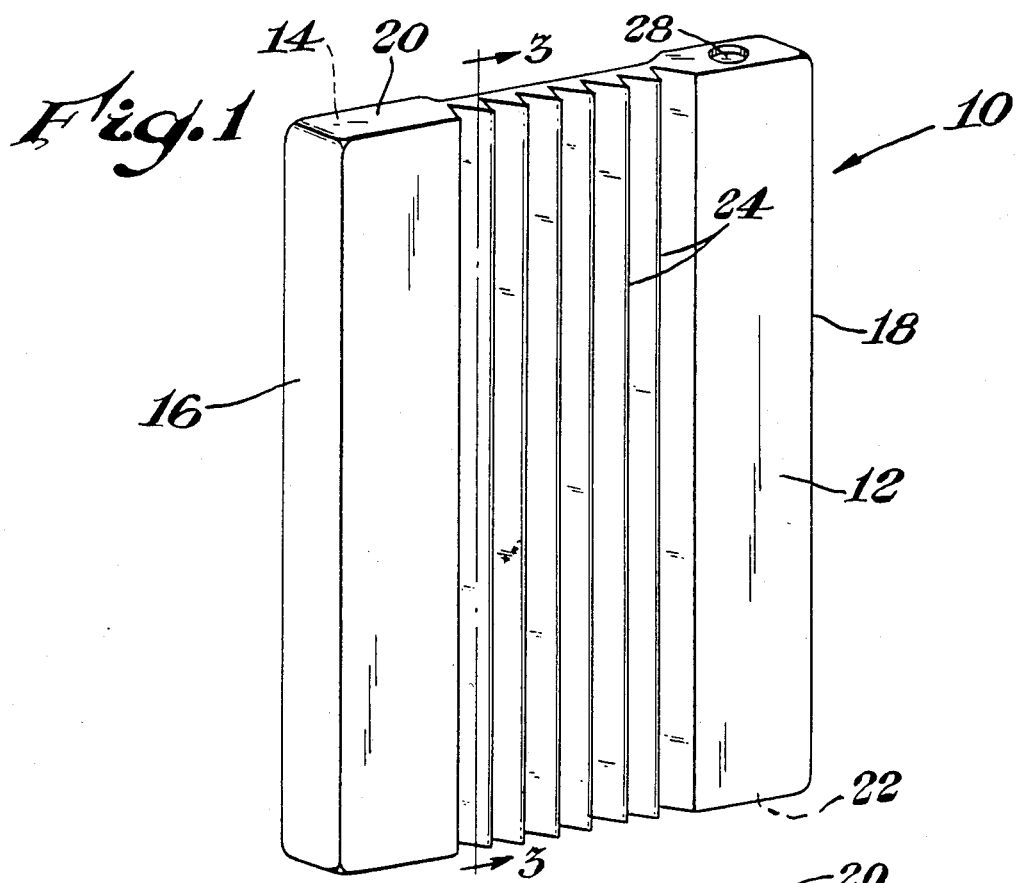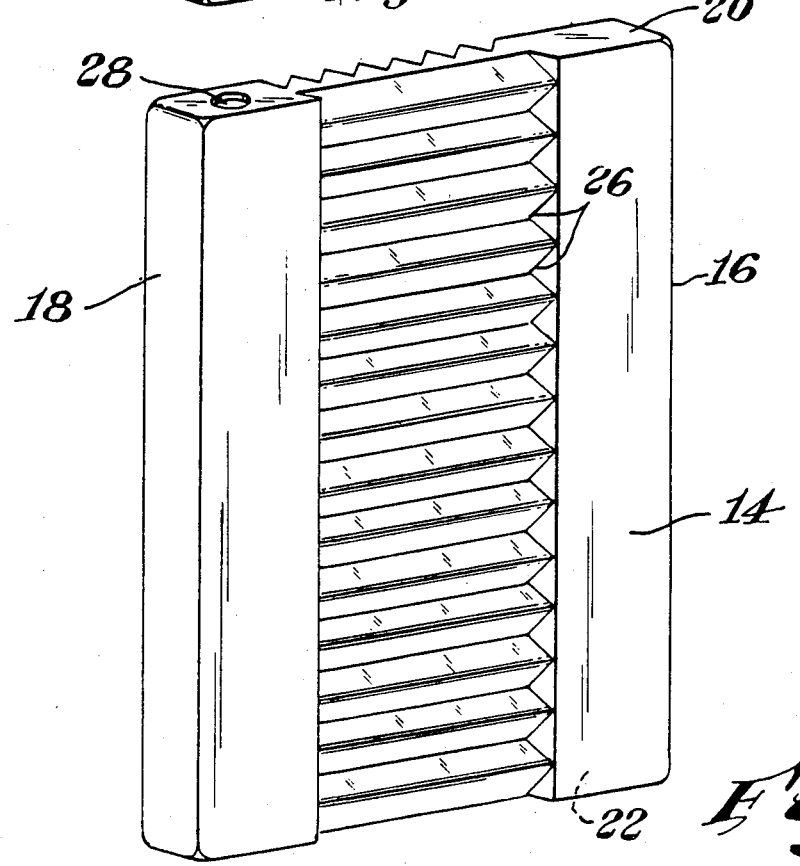

CONTAINER FOR THERMAL ENERGY STORAGE MATERIALS

This is a continuation of application Ser. No. 486,273, filed Apr. 18, 1983, now abandoned.

BACKGROUND OF THE INVENTION

The present invention resides in a container for storing a hydrated phase change material (PCM). More particularly, the invention resides in a container of a synthetic resinous material which is made by rotomolding to form a highly stress resistant container for the hermetic storage of hydrated PCM's.

In the past, various types of thermal energy storage materials or phase change materials have been used in a variety of heating or cooling installations. Such uses have been, for example, in thermal energy storage applications such as water heating, solar heating, storage of coolness during off-peak energy use and release of coolness during periods of peak power use, and the like.

PCM's are greatly preferred as a thermal energy storage material since they will absorb large amounts of energy with no change in temperature in their melting phase change. Accordingly, the use of a PCM allows for a much greater energy storage per unit volume compared to sensible heat storage mediums such as water or rocks. For example, sodium sulfate decahydrate (Glauber's salt) is a well known PCM which absorbs a large amount of energy before it melts at a temperature of 90° F. In the temperature range of from 85° to 110° F., the PCM will store about 5 times more energy than water and 17 times more than rock for an equal volume of material. Accordingly, the storage volume with a PCM is greatly reduced while the thermal energy storage efficiency is substantially improved. Any number of well known hydrated PCM's that melt and freeze over a desirable temperature range and which are readily available, may be used in the container of the invention. Typical PCM's are those listed, for example, in ASHRAE Journal of September, 1974, in an article entitled "Solar Energy Storage" by M. Telkes.

The storage of PCM's has been extensively investigated in past years since containers for PCM's must be able to withstand various stresses over a long period of time during which the PCM undergoes innumerable freeze-thaw cycles. Note Report ORO/5217-8 of November, 1978 entitled "Macro Incapsulation of Phase Change Materials," authored by G. A. Lane et al. The study was conducted under the auspices of DOE. Studies generally have shown that containers for hydrated PCM's must be constructed of a durable material and must be reliably leak-proof to liquids and vapors. Since PCM's are generally corrosive, the containers must also be constructed of a material which is not corroded by a particular PCM.

Metallic containers or cans made of coated steel or aluminum have been reliably used for foods or beverages. Usually, the containers have at least one crimped end closure. Such containers are not suitable, however, for use in the storage of PCM's since cycling tests have shown that repeated melting and solidification of the PCM, gradually caused leakage through the sealed rims. Similar results were observed with soldered seams which proved to be unsatisfactory as well. Dissimilar metals produced an electric potential during contact with the PCM thereby producing a "battery effect" that resulted in the corrosion of the metal container. Other materials such as stainless steel or corrosion resistant metals may prove to be effective over long periods of time but their cost is prohibitive and thus are an impractical alternative to other low cost materials.

An attractive alternative to metal containers have been containers made from synthetic resinous materials. A container in the form of a sealed cylinder of high density polyethylene is disclosed in U.S. Pat. No. 4,299,274 (S. Campbell), issued Nov. 10, 1981. However, such elongated tube-like containers are separately provided with fusion welded caps to seal the open ends of the tubular storage container. Alternatively, the open ends are heated and pinch sealed under fusion. Angled or non-linear pinch configurations are described to minimize any tendency for thermal distortion. Nevertheless, in all of the described sealing methods, the seals are vulnerable and have a tendency to crack under the continued flexural stress to the wall of the tube during freeze-thaw cycling of the PCM within the tube. Moreover, the tube-like containers described in the patent to Campbell have a relatively low surface area to volume ratio and consequently do not collect or distribute heat as well as trays or panels of a generally flat and rectangular shape which allow for an improved surface to volume ratio for storing and releasing thermal energy.

Various other types of systems for containing PCM's are described in, e.g., U.S. Pat. No. 2,595,905 (M. Telkes), issued May 6, 1952; U.S. Pat. No. 3,720,198 (N. Laing et al.), issued Mar. 13, 1973; U.S. Pat. No. 4,237,023 (T. E. Johnson et al.), issued Dec. 2, 1980; U.S. Pat. No. 4,259,401 (D. Chahroudi et al.), issued Mar. 31, 1981; U.S. Pat. No. 4,277,357 (B. J. Boardman), issued July 7, 1981; U.S. Pat. No. 4,290,416 (T. Maloney), issued Sept. 2, 1981; and U.S. Pat. No. 4,337,754 (S. J. Conger), issued July 6, 1982.

In an article entitled "Heat of Fusion Systems for Solar Heating and Cooling"; *Solar Engineering* of September, 1977, pages 26–29, the author, M. Telkes, describes various containers that may be used for the storage of PCM's. With respect to plastic containers, the author included thermoformed or blowmolded containers which may be tray-like units and in which the trays "must be used horizontally and can be stacked with spacers". Such plastic containers are said to be formed of high density polyethylene or polypropylene combined with certain additives. Trays of the type referred to hereinabove were manufactured by Solar, Inc. of Mead, Neb. and are described in *Solar Engineering* of April, 1980, p. 44.

It has been found, however, that containers for PCM's still are not entirely satisfactory if manufactured by the standard methods of molding.

SUMMARY OF THE INVENTION

The present invention provides a seamless container containing a hydrated phase change material wherein said phase change material undergoes expansion during its phase change from a frozen to a molten state and undergoes contraction during its phase change from a molten to a frozen state, said container being generally rectangular in shape and comprising opposed front and rear walls, opposed side walls, and opposed top and bottom walls, said top wall having an opening for introduction of the phase change material into the container, and a closure member for closing the opening and for hermetically sealing the phase change material within the container, said container being constructed of a synthetic resinous material and formed by rotational molding during which the synthetic resinous material is concentrated in the corners of the container such that the corners have an internal rounded contour with an increased thickness and are capable to withstand repeated flexure of the container wall during expansion and contraction cycles of the phase change material.

BRIEF DESCRIPTION OF THE DRAWING

FIG. 1 is a front view, in perspective, of a thermal energy storage container of the invention.

FIG. 2 is a rear view, in perspective, of the thermal energy storage container.

DESCRIPTION OF THE INVENTION

Figure 3:
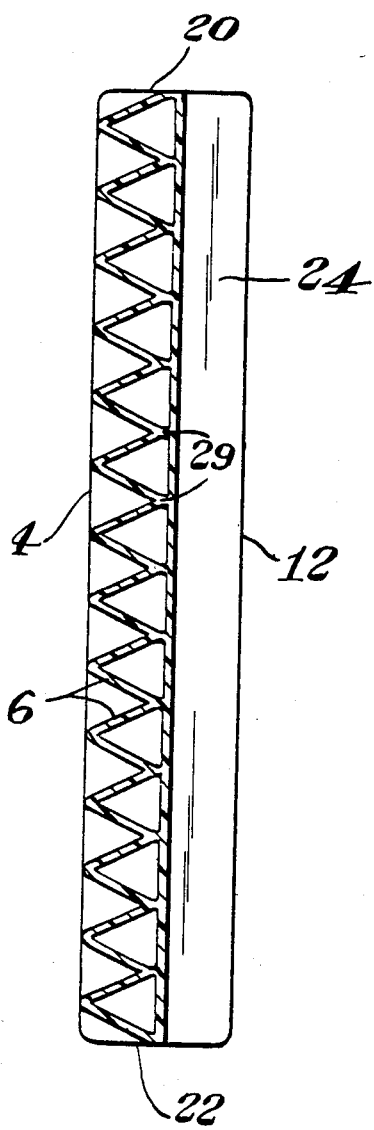
FIG. 3 is a side view, in cross-section, of the container, taken along line 3—3 of FIG. 1.

There are three major deterrents to the practical use of containerized PCM's which are segregation of and supercooling of the PCM, and container failure.

Segregation occurs during the freeze-thaw cycles of incongruently melting PCM's. When an incongruently melting PCM cools, crystals are formed which contain less water than the bulk of the PCM. Since the salt crystals are heavier than the remaining liquid, they settle out and are prevented from reforming with water molecules. Effectively congruently melting PCM's have now been developed in which the precipitation of undesired crystal forms on repeated melting and crystallization is substantially reduced. Examples of such PCM's are mixtures of hydrated $CaCl_2$ and KCl described in U.S. patent application Ser. No. 364,159, filed Mar. 31, 1982 and Ser. No. 417,275, filed Sept. 13, 1982, both applications by G. A. Lane et al., the subject matter of which is incorporated herein by reference.

Supercooling refers to the discrepancy between the temperature at which freezing initiates and the melting temperature of a PCM when cooled and heated under quiescent conditions. Supercooling of a PCM is substantially reduced by the addition of an adequate amount of a nucleating agent. Without such addition of a nucleator, the PCM supercools and does not revert to a solid when the temperature drops to the transition temperature at which the PCM recrystallizes, but requires a lower temperature to initiate a change back to a solid. Suitable nucleators for particular PCM's are described in the literature and in the aforementioned patent applications by G. A. Lane et al.

Container problems have been experienced as a result of the necessity of having an inexpensive material that will not be corroded by contact with the hydrated salt PCM and that will be sufficiently strong to withstand the expansionary and contractionary forces of the PCM over a long period of time during which the PCM undergoes freeze-thaw cycling.

With particular reference to FIGS. 1 and 2, there is illustrated a front and rear perspective view, respectively, of an embodiment of a container generally illustrated by reference number 10. The container is of a generally rectangular shape and has a front wall 12, a rear wall 14, side walls 16 and 18, a top wall 20, and a bottom wall 22. The top wall 20 is provided with an access or fill opening 28 through which a hydrated PCM is introduced into the container. The opening 28 is closed, after filling of the container with the hydrated PCM, with a closure member (not shown). The closure member is preferably of the same polymeric material as the container itself and is positioned in the opening and welded to the container wall by techniques, e.g., spin or ultrasonic welding. Welding of the closure member must be effective to hermetically seal the PCM within the container to prevent evaporation of water or leakage of the PCM past the closure member seal.

The panel 10 is provided with a plurality of vertical indentations or corrugations 24 in the front wall 12 thereof. The rear wall 14 of the panel is provided with a plurality of similar corrugations 26 but extending perpendicular, i.e., horizontally, with respect to the corrugations in the front wall. It will be apparent that the corrugations in the front wall can be disposed in a generally horizontal direction while the corrugations in the rear wall are disposed in a generally vertical direction such that the corrugations are in a substantially right-angular relationship with respect to each other. It will also be apparent that the corrugations in the front and rear walls can be disposed with respect to each other such that the relative angle between the corrugations is less than 90 degrees, i.e., diagonally with respect to the top and bottom walls of the panel.

The corrugations in the front and rear walls 24, 26 are generally V-shaped grooves and, in cross-section, provide alternating peaks and troughs wherein the troughs of the corrugations preferably extend about midway into the panel, i.e., midway from the front wall towards the rear wall and, correspondingly, midway from the rear wall toward the front wall. The troughs of the corrugations in the front and rear walls meet and intersect therefore at a point approximately half of the distance of thickness of the panel. From FIG. 3, it will be seen that at the point of intersection, the troughs are fused to each other to form a grid of equidistantly spaced fusion points 29. The number of fused points 29 depend, of course, on the number of corrugations which are provided in each of the front and rear walls of the panel.

The corrugations in the front and rear walls beneficially provide an enlarged surface area capable of absorbing and releasing greater amounts of energy per unit area of panel surface. The fused points 30 forming the grid may extend over substantially the entire surface area of the front and rear panels and thus provide for an extremely stable panel configuration in which the front and rear walls are held in a substantially parallel relationship, with a minimum amount of bulging or bowing out, throughout the freeze-thaw cycles of the energy storage material contained within the panel.

It will be readily apparent to the artisan that panels for PCM's can be designed of different configurations to provide a stabilizing grid of contact points between the front and rear walls to inhibit or reduce flexing of the walls during expansion and contraction of the PCM in the freeze-thaw cycles. For example, the panel illustrated in FIGS. 1 and 2 may be provided with corrugations in either the front or rear panel extending either in a vertical on horizontal direction. If the corrugations are provided in the front wall the troughs would extend into and be fused with the rear wall to form a reinforcement of linearly extending, spaced fusion points. Other effective designs may include so-called "kiss offs" in which indentations are provided in the panel to form mutually spaced fused contact areas between the front and rear walls. Various other reinforcement designs may be incorporated in the panel of the invention provided that they meet the preferred criteria of forming a large surface area with respect to the volume of the container and that a sufficient number of reinforcing fusion or contact points are provided to prevent an unduly large amount of flexing of the container wall during the freeze-thaw cycling of the PCM.

Figure 4:
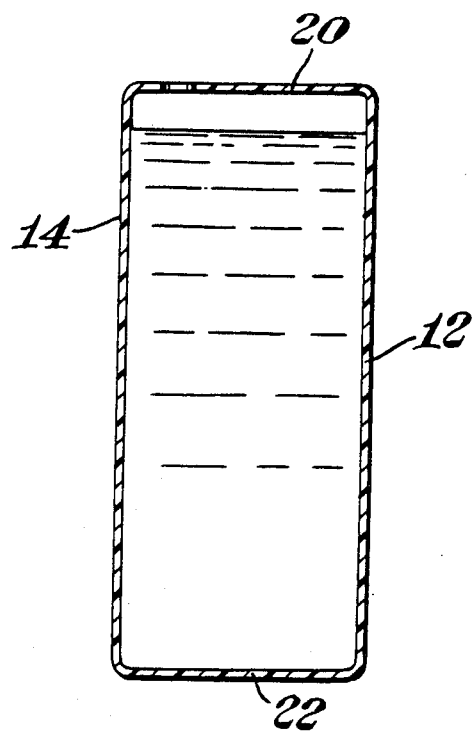
FIG. 4 is a cross-sectional view of a container which is filled with a PCM in the liquid or thawed condition.
Figure 5:
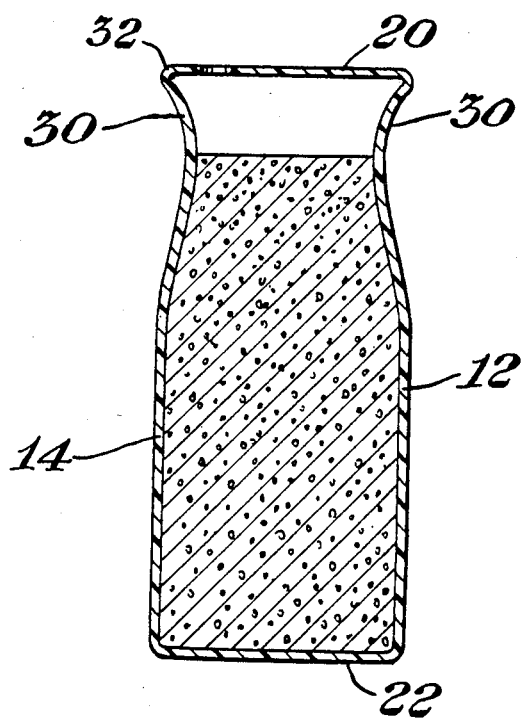
FIG. 5 is a cross-sectional view, of the container of FIG. 4 in which the PCM is in a solid or frozen condition.

FIGS. 4 and 5 are cross-sectional views of a simple rectangular panel construction. The panel is filled to about 95 percent of the internal volume with a liquid phase change material. As the PCM crystallizes and assumes a solid shape, it is accompanied by a reduction in volume by about 10 percent. This reduction in volume results in a deformation of the panel walls which is more clearly illustrated in FIG. 5.

As shown in FIG. 4, the sidewalls 12 and 14 of the panel are substantially parallel with respect to each other when the PCM contained within the panel is in a liquid or thawed condition. As the PCM crystallizes, during the retrieval of energy from the PCM, the crystallization of the PCM first occurs adjacent to the bottom 22 of the panel. Further crystallization of the PCM, during the freezing cycle, gradually progresses from the bottom 22 towards the top 20 of the panel causing a gradual contraction of the PCM accompanied by a corresponding pulling-in of the upper portions 30 of the sidewalls 12 and 14 as illustrated in a somewhat exaggerated manner in FIG. 5. Repetitive flexing of the upper sidewall portions inwardly and outwardly during successive freeze-thaw cycles of the PCM induces particularly severe stresses in the corners 32 of the panel where the sidewalls 12, 14 join the top wall 20. Over an extended period of time, these corners tend to weaken and crack to form passageways which allow the escape of water vapor or liquid (i.e., the hydrated PCM) from the panel thereby destroying the hermetic seal. Any leakage of water vapor from the panel would reduce the ratio of water to the salt in the PCM and thus gradually destroy the ability of the PCM to perform efficiently. Obviously, any leakage of the PCM itself from the panel would also result in a decreased performance of the panel and possibly in damage to the building structure itself in which the panel is mounted.

It has been noted that particularly severe cracks developed in the corners of blowmolded containers after only a relatively few freeze-thaw cycles particularly when the containers were placed in an upright position. In an upright position, a greater degree of flexture occurred in the corners 32 due to a more pronounced pulling-in of the side walls at the upper portion of the panel. This same phenomena was not noted to be as pronounced in panels or trays which had been placed in a horizontal position, i.e., where the flexure is distributed over a larger area of the panel walls. Since it is oftentimes desired to place panels in a vertical or upright position, as for example between the studs of a building wall, it is essential that such panels be capable of withstanding the stresses imposed on the corners due to the repeated flexing of the sidewalls during the freeze-thaw cycling of the PCM.

It has now been found that thermoplastic resinous materials which are introduced as a blank into a mold for subsequent blowmolding or injection blowmolding of containers for PCM's result in an uneven distribution of the plastified polymeric material over the inner surfaces of the mold. In a generally rectangularly shaped mold, expansion of the plastified material during blowmolding results in a stretching of the resin blank as the resin expands outwardly toward the inner surfaces of the mold. Accordingly, the plastified material will first contact the nearest planar surfaces of the mold, such as the surfaces forming the front and rear walls of the panel (followed by contact of the side, top and bottom surfaces), and adhere to these inner wall surfaces as a relatively thick layer which has little tendency to spread out and distribute itself more evenly over the remaining mold surfaces. As the molding cycle progresses, the plastified resin is increasingly stretched as it approaches the more distant surfaces of the mold, particularly the corners and other more inaccessible regions of the mold. Any stretching of the plastified resin is also accompanied with a corresponding thinning or reduction in the thickness of the resin as it finally approaches and engages the more inaccessible regions of the mold. Accordingly, the corners of a blowmolded container will have a thickness which is less than the thickness of the remaining major wall portions of the container itself. A similar shortcoming was observed in the vacuum forming of containers which also produced corners in which the wall thickness was less than the thickness over the remaining major wall portions of the container.

Vacuum forming processes produce containers with a seam which can be particularly troublesome in maintaining the integrity of the container over extended periods of time and during the freeze-thaw cycling of a PCM. It was found that the seams were weak points in the container and particularly subject to cracking followed by leakage of water vapor or of the PCM itself through the cracks in the seams of the container.

It has now been surprisingly found that portions of containers for PCM's which are most subject to flexing, particularly the corner portions are substantially strengthened by forming the containers by the rotational molding process. The process is conducted by weighing out a predetermined quantity of a thermoplastic resinous material, usually in dry-powder form, and placing the resin in the mold which is then securely closed. The mold is rotated about two perpendicular axes while being first heated and then cooled.

In the heating step, the thermoplastic material, having been distributed over the entire inner surface of the mold, begins to fuse as the mold is heated. Initial partial fusing forms a porous skin on the mold surface which gradually melts to form a homogeneous layer of melted plastic of uniform thickness. A sufficient period of time must be scheduled for the resinous material to be completely distributed and fused.

It should be noted that rotational molding is not a centrifugal casting process. Since the center of gravity of most molds does not pass through both axes of rotation, and all mold surfaces are usually not equidistant from the center of rotation, any centrifugal forces generated would cause large variations in wall thickness. The forces generated by the high rotational speeds would cause the molten resin to flow toward the highest force concentration, rather than to distribute itself evenly about the entire mold surface as in rotational molding.

During the heating cycle of a rotational molding process, the resin particles gradually increase in temperature to the point where the particles reach their melt temperature and stick to the hot walls of the mold. As the heating cycle continues, more particles adhere to the wall until the entire inner mold surface is coated.

At this time, the actual buildup of wall thickness begins until all free particles in the mold have adhered to form a coating of uniform thickness. If the heating cycle were terminated at this point, the resultant part would be a rather weak, porous structure with a thin skin on the outside surface. A homogeneous wall of solid material does not form until the entire shell of the part is formed. Thereafter, with continued heating, the particles melt completely and fuse into a single molten layer of synthetic resinous material.

Molding of panels by the aforedescribed rotational molding process have the advantage of producing a product with extremely uniform wall thicknesses. More importantly, in a rotational molding process, the synthetic resinous material has a tendency to concentrate or build-up in the corners thus producing an article in which the corners are of an internal rounded contour with an increased thickness and thus a correspondingly increased strength capable of withstanding repeated flexure of the walls during the freeze-thaw cycles of the PCM over extended periods of time.

The synthetic resinous material employed in the rotational molding of the panel of the present invention are polyethylene or polypropylene which may include additives. Preferably, the sythetic resinous materials used are ethylene or propylene homopolymers or copolymers with an acyclic mono-1-olefinic hydrocarbon possessing from 4 to 8 carbon atoms per molecule, or mixtures of the above having a density of from 0.915 to 0.970 gm/cm$^3$ and a melt index of from 1.5 to 30 as measured by ASTM D-1238 test method. A particularly preferred material is a copolymer of ethylene and a higher alpha olefin having a density of about 0.935 gm/cm$^3$ and a melt index of about 6.0 and which is characterized by having a narrow molecular weight distribution.

The above polymers may contain additives such as, for example, cross-linking agents (e.g., organic peroxides or organic silanes), pigments, anti-oxidants, U.V. stabilizers; non-reactive fillers; and the like. Preferably, the polymers contain U.V. stabilizers such as carbon black and antioxidants.

The wall thickness of the panel depends on its size and the amount of PCM contained within the panel. Preferably, panels of the invention are rotomolded to a size which allows them to be installed between the studs of a standard wall concentration. Thus, the panel of the invention preferably has a width of from 33 to 37 cm (13 to 14½ in); a length of from 53 to 57 cm (21 to 22½ in) and a thickness of from 2.5 to 10 cm (1.0 to 4.0 in). For panels of that size, the wall thickness ranges from 1.27 to 3.8 mm (50 to 150 mils).

Panels of the invention are particularly well adapted for being positioned in an upright position, i.e., in a position where the panels are placed between the studs of a building wall. Optionally, panels may be stacked upon one another such that the bottom of an upper panel is resting upon the top of a lower panel and with the sides of the panels suitably secured between the studs. It will be readily apparent that panels of the invention can also be arranged in a wall-type module where the individual panels are positioned side by side and stacked one on top of each other to provide a greatly enlarged surface area for the storage of energy.

The panels may also be provided with means where they can be easily secured between the studs of a wall by ordinary methods. For example, an abutment strip can be nailed to the inside surface of the wall studs such that a panel when placed against this strip is flush with an outwardly facing surface of the stud. The panels are then held in place by nailing a capping strip to the stud. Glazing can then be secured to this capping strip and the interior wall applied in the usual fashion.

Other variations of installation techniques may be used wherein a panel may be provided with an integral side strip or tab such that the panel can be nailed by its tab to the inner or outer edges of the studs. Panels could also be framed to be in the center of the studs, allowing the external siding or glazing to be attached directly to the studs. Various other forms of installation of the panels of the present invention to provide a wall module will be apparent to persons skilled in the building art.

To augment heat removal, vents may be placed at the bottom and top of the interior wall to allow air circulation over the interior side of the panels. A small thermostatically controlled fan can also be used to increase air flow and thus, the rate of heat removal.

The following experiments were conducted in order to determine the durability of containers manufactured by the rotational molding technique of the invention.

CONTROL EXAMPLE 1

Containers in the form of tall bottles were filled with a $CaCl_2.6H_2O$ phase change material. The bottles were constructed of polyethylene and were produced by a blow molding technique. The containers had volumes of 0.47 and 1.0 liters, and were filled 90 percent full with the PCM. Six containers of each size were placed in a forced air chamber and subjected to temperature cycling between a minimum temperature of 0° C. and a maximum temperature of 50° C. for a sufficient time period to cause the PCM within the containers to convert from a solid phase to a liquid phase and back again. During this temperature cycling, the volume change associated with the phase change process caused the containers to be subjected to flexural stress. At the end of 150 cycles, the containers were examined. It was found that all 12 containers had developed stress cracks at their top corner edges.

CONTROL EXAMPLE 2

Three bottle-shaped containers with a capacity of 1 liter were produced by the blow molding technique as described in Control Example 1, were filled with the same PCM, and subjected to the same temperature cycling. The only difference was that the containers were placed on their sides, i.e., in a horizontal position. During cycling, the containers were examined. One container failed after three cycles. A second container failed at 411 cycles and a third container survived 600 cycles without failure at which point temperature cycling was discontinued. From this experiment, it was concluded that blow molded containers have a better survival rate when they are subjected to temperature cycling in a horizontal position which reduces flexural stress on the corners but not to the extent that all of the containers could be relied upon to withstand freeze-thaw cycling over a long period of time, i.e., 10 years or longer.

EXAMPLE 3

Four generally rectangularly, panel shaped containers or polyethylene were produced by the rotomolding technique. The containers had a size of 14 inches×22 inches×1½ inch and a wall thickness of about 100 mils. The containers were filled about 90 percent full of the PCM described in Examples 1 and 2. The fill openings were sealed by spin welding and placed in an upright standing position in a forced air cycling chamber and subjected to temperature cycling (at the same temperature as in Control Example 1) at a rate of 2 cycles per day. After 150 temperature cycles, the containers were examined. No failures were detected at the edges or in the corners of the containers, nor were any signs of flexural stress observed.

From the foregoing examples, it will be recognized that containers for PCM's produced by rotational molding have been substantially improved in durability which is a primary consideration in that the containers must be capable of withstanding the stresses induced on the containers over many years of freeze-thaw cycles of the PCM within the panel. Rotational molding of containers for storage of PCM's provide for an improvement in strength and durability for the panels which are overriding factors in providing a reliable product for the marketplace. Although the speed of rotational molding particles is generally somewhat slower than conventional blowmolding or vacuum forming techniques, rotational molding in accordance with the present invention assures a more even distribution of the synthetic resinous material over the surfaces of the mold and particularly an increased thickness in the corners of the mold to provide additional strength to the containers when used for the storage of PCM's.

What is claimed is:

1. A seamless container containing a hydrated phase change material wherein said phase change material undergoes expansion during its phase change from a frozen to a molten state and undergoes contraction during its phase change from a molten to a frozen state, said container being generally rectangular in shape and comprising opposed front and rear walls, opposed side walls, and opposed top and bottom walls, one of said walls having an opening for introduction of the phase change material into the container, and a closure member for closing the opening and for hermetically sealing the phase change material within the container, a plurality of spaced indentations extending from either of the front or rear walls and merging into the opposite wall for maintaining the front and rear walls in a substantially fixed parallel position with respect to each other, said container being constructed of a synthetic resinous material and formed by rotational molding during which the synthetic resinous material is concentrated in the corners of the container such that the corners haven an internal rounded contour with an increased thickness and are capable to withstand repeated flexure of the container wall during expansion and contraction cycles of the phase change material.

2. A seamless container containing a hydrated phase change material wherein said phase change material undergoes expansion during its phase change from a frozen to a molten state and undergoes contraction during its phase change from a molten to a frozen state, said container being generally rectangular in shape and comprising opposed front and rear walls, opposed side walls, and opposed top and bottom walls, said top wall having an opening for introduction of the phase change material into the container, and a closure member for closing the opening and for hermetically sealing the phase change material within the container, a plurality of spaced indentations extending inwardly from the front wall and from the rear wall and merging at a position intermediate of said walls, said container being constructed of a synthetic resinous material and formed by rotational molding during which the synthetic resinous material is concentrated in the corners of the container such that the corners have an internal rounded contour with an increased thickness and are capable to withstand repeated flexure of the container wall during expansion and contraction cycles of the phase change material.

3. The container of claim 2, wherein the spaced indentations are a plurality of first longitudinal grooves in one of said front or rear walls, and a plurality of second longitudinal grooves in the other of said front or rear walls, said first grooves being positioned at an angular relationship with respect to said second grooves, said first and second grooves merging at the intersection of their apexes intermediate of said container front and rear walls to form a grid of spaced supports for the walls.

4. The container of claim 3, wherein the grooves in the front wall are substantially perpendicular with respect to the grooves in the rear wall.

5. The container of claim 1 or 2, wherein the synthetic resinous material is selected from the group consisting of homopolymers of ethylene or propylene, copolymers of ethylene and propylene, copolymers of ethylene or propylene with an acylic mono-1-olefinic hydrocarbon possessing from 4 to 8 carbon atoms per molecule, and mixtures thereof, said homo- or copolymers having a density of from about 0.915 to about 0.970 gm/cm$^3$ and a melt index of from about 1.5 to 30 as measured by ASTM D-1238.

6. The container of claim 1 or 2, wherein the synthetic resinous material is a copolymer of ethylene and a higher alpha-olefin having a density of about 0.935 gm/cm$^3$ and a melt index of about 6.0 and which is characterized by having a narrow molecular weight distribution.

* * * * *